United States Patent [19]

Cribbs et al.

[11] Patent Number: 4,557,049
[45] Date of Patent: Dec. 10, 1985

[54] HAND HELD FIBER OPTIC CLEAVING TOOL

[75] Inventors: Doyle E. Cribbs, Titusville; James R. Weckerly, Kennerdell, both of Pa.

[73] Assignee: GTE Products Corporation, Stamford, Conn.

[21] Appl. No.: 634,672

[22] Filed: Jul. 30, 1984

Related U.S. Application Data

[63] Continuation of Ser. No. 368,853, Apr. 15, 1982, abandoned.

[51] Int. Cl.[4] .................... B26B 13/26; B65H 23/00
[52] U.S. Cl. .................................. 30/124; 225/96
[58] Field of Search ............... 30/124; 225/105, 96, 225/96.5, 2, 101

[56] References Cited

U.S. PATENT DOCUMENTS

| | | | |
|---|---|---|---|
| 4,074,840 | 2/1978 | Fulenwider | 225/105 |
| 4,154,385 | 5/1970 | Leyvis | 225/2 |
| 4,159,793 | 7/1979 | Belmonte et al. | 225/105 |
| 4,179,807 | 12/1979 | Allias et al. | 225/2 |
| 4,229,876 | 10/1980 | Doty | 225/96.5 |

Primary Examiner—Paul A. Bell
Assistant Examiner—Paul M. Heyrana
Attorney, Agent, or Firm—William H. McNeill

[57] ABSTRACT

A hand tool for cleaving optical fibers including an elongated body having a longitudinal axis extending lengthwise thereof. A fiber support surface is attached to the body and extends in a plane which is transverse to such longitudinal axis. Fiber clamping means are provided which are pivotally attached to the body for clamping or holding the optical fiber in place upon the fiber support surface and for subjecting the optical fiber to tension. Cutting means are also attached to the body and are moveable in the general direction of such longitudinal axis towards the fiber support surface for severing such optical fiber such that the end face of the fiber is smooth and lies in a plane perpendicular to the axis of the fiber.

11 Claims, 8 Drawing Figures

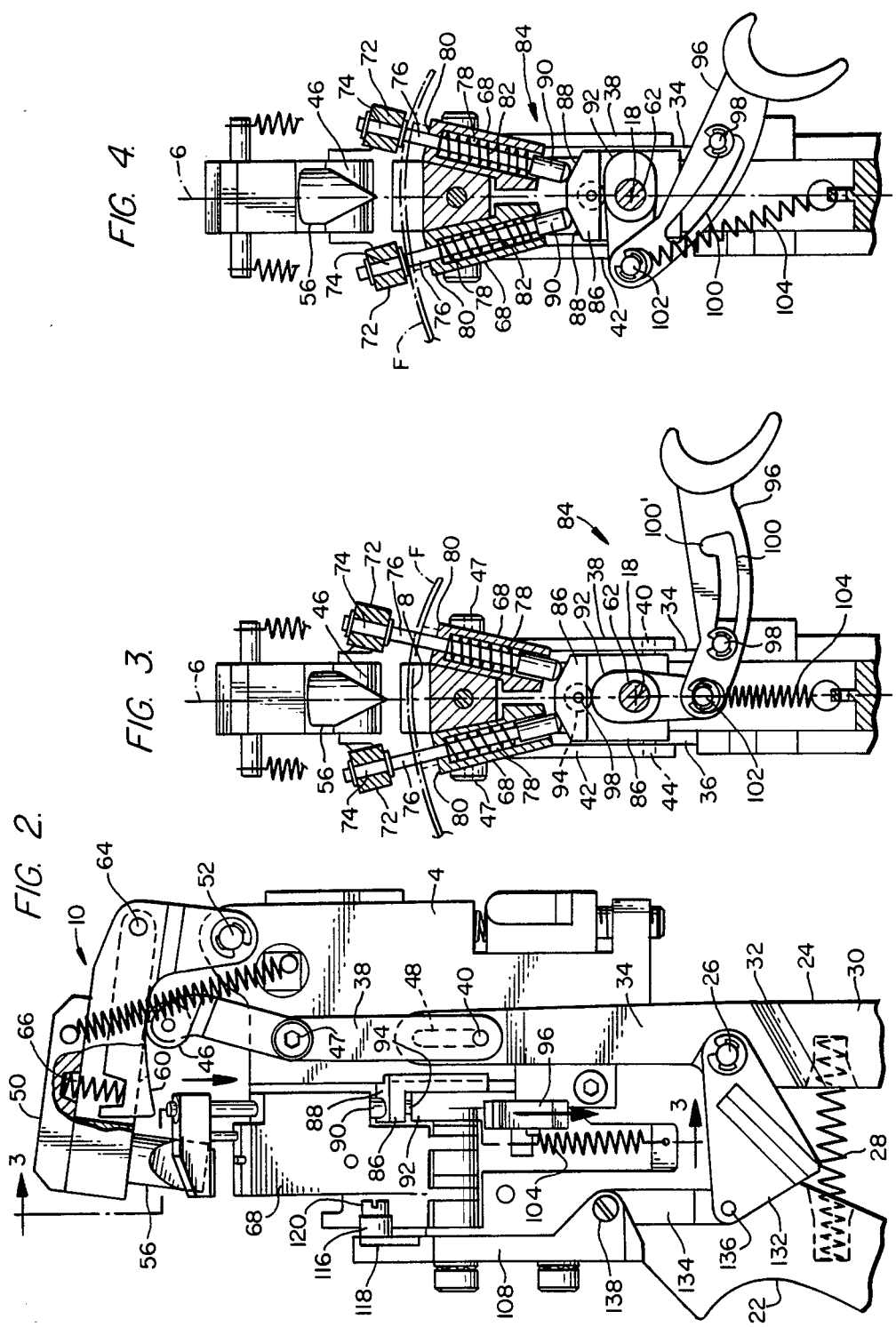

HAND HELD FIBER OPTIC CLEAVING TOOL

This application is a continuation of application Ser. No. 368,853, filed Apr. 15, 1982, now abandoned.

BACKGROUND OF THE INVENTION

This invention is directed to a tool for cleaving optical fibers.

It is often desirable to transmit light energy by means of optical fiber wave guides. For example, visible light may be transmitted to a remote location by means of a single fiber wave guide. In more complex applications multiple specific optical signals may be transmitted. An example of a more complex application is a communication system using multiple optical fiber wave guides for transmission of signals. Whether single or multiple fiber wave guides are used, such devices often require the coupling of fibers in end to end relationship. A particularly serious problem which may be incurred as a result of such coupling of fiber ends is the loss of light at the coupling. For example, if the ends of the fibers being joined are uneven excessive light loss may occur as a result of reflection and refraction of light at the junction region.

In order to minimize such light loss it is desirable to cleave optical fibers such that the faces of the fibers are smooth and lie in a plane perpendicular to the axis of the fibers. When fibers cleaved in this manner are properly joined in end to end relationship loss of light is minimized at the juncture region.

For field work it is particularly desirable to have a cleaving tool which can be simply and reliably used to properly cleave the fibers to minimize light loss when fibers are joined. It is desirable that such cleaving operation be done as quickly as possible and that the operation be easily repeatable for cleaving additional fibers and obtaining consistent results. To assure that the faces of the fiber are smooth and lie substantially in a plane perpendicular to the axis of the fibers, it is desirable to provide a hand tool which firmly clamps the fiber into position and controls the tension applied to the fiber during the cutting operation independent of operator technique. It is also desirable to provide a hand tool having universal application in any weather environment, which tool may be held in one hand regardless of whether the operation is right or left handed.

U.S. Pat. No. 4,257,546 to Benasutti describes an optical fiber cleaving tool including means to support and tension an optical fiber along an axis transverse to the longitudinal axis of the tool body. A cutting element is provided which is caused to move back and forth in a direction substantially normal to the axis of the optical fiber and corresponding to such longitudinal axis.

SUMMARY OF THE INVENTION

This invention achieves the foregoing objects by providing a hand held tool for cleaving optical fibers comprising an elongated body having a longitudinal axis extending lengthwise thereof. A fiber support surface is attached to the body and extends in a plane which is transverse to such longitudinal axis. Cutting means are also attached to the body and are moveable in the general direction of such longitudinal axis towards the fiber support surface for severing an optical fiber extending across the fiber support surface. Clamping means are pivotally attached to the body for clamping the optical fiber, and for pivotal movement about an axis transverse to such longitudinal axis for holding the optical fiber under tension, during the cleaving operation.

BRIEF DESCRIPTION OF THE DRAWINGS

This invention may be clearly understood by reference to the drawings in which:

FIG. 2 is a partial side elevational view of such cleaving tool in a non-cleaving position;

FIG. 3 is a partial sectional view taken along line 3—3 of FIG. 2 showing clamping jaws of the present invention in an unclamped position;

FIG. 4 is a partial sectional view taken along line 3—3 of FIG. 2 showing such jaws in a clamped position;

DESCRIPTION OF THE PREFERRED EMBODIMENT

Figure 1:
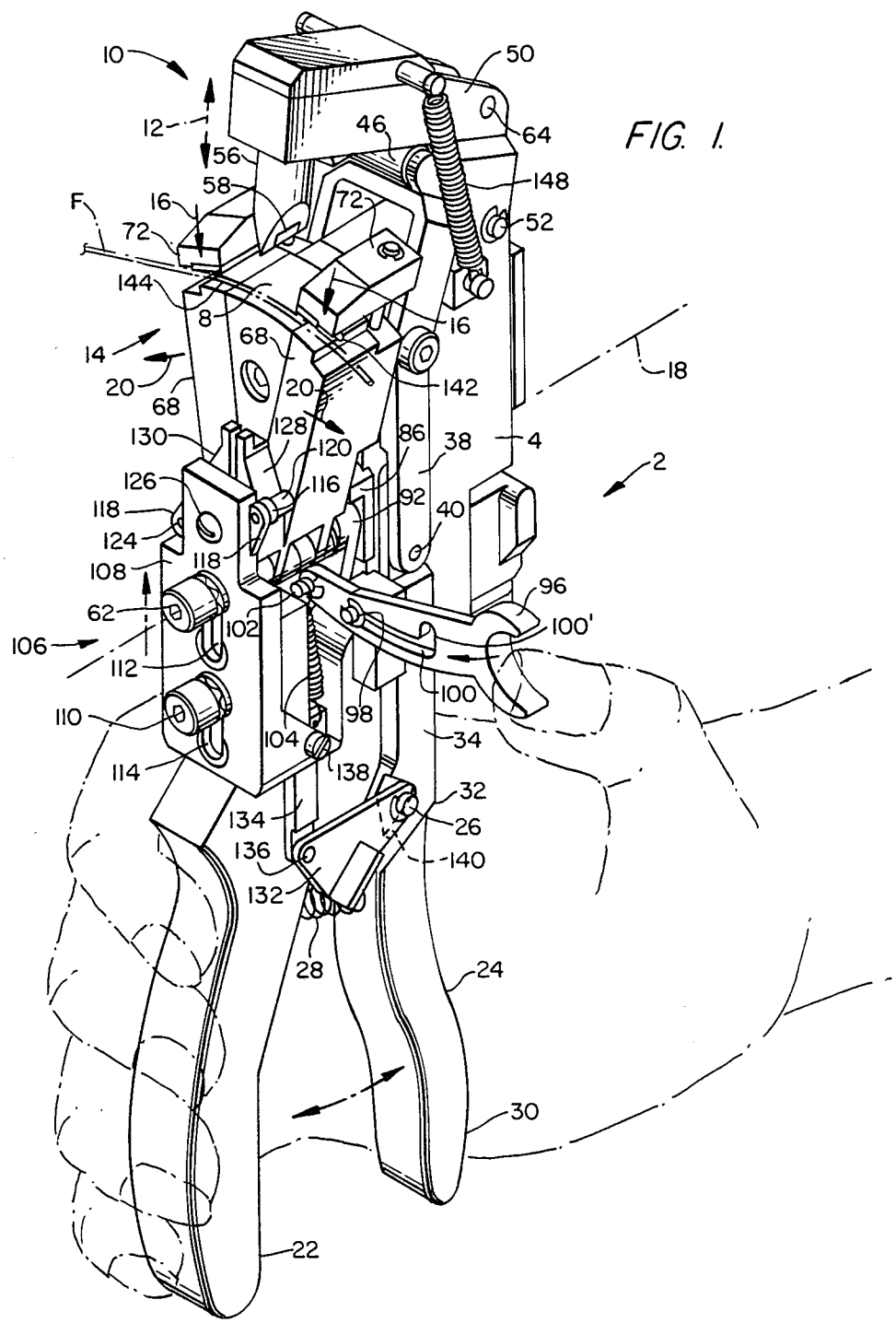
FIG. 1 is a perspective view of the hand held cleaving tool of the present invention.

The embodiment of this invention which is depicted in the drawings is one which is particularly suited for achieving the objects of the invention. The drawings depict a hand held tool 2 for cleaving optical fibers comprising an elongated body 4 having a longitudinal axis 6 extending lengthwise thereof. An anvil having a fiber support surface 8 is attached to the body and extends in a plane which is tranverse to longitudinal axis 6. As shown in FIG. 1, fiber support surface 8 is preferably arcuate to provide a curved surface to support optical fiber F. Cutting means generally designated 10 are attached to body 4 and are moveable in the direction identified by arrow 12 in the general direction of longitudinal axis 6 towards fiber support surface 8 for severing optical fiber F which extends across the support surface and then away from such surface. Clamping means generally designated 14 are pivotally attached to body 4 for clamping the optical fiber F in a direction identified by arrows 16 and for pivotal movement about an axis 18 transverse to longitudinal axis 6 for holding the optical fiber F under tension in a direction identified by arrows 20.

Tool 2 may further comprise a handle 22 extending from body 4 and at least one elongated first lever 24 pivotally attached to body 4 for pivotal movement relative to body 4 and handle 22 and spring biased relative to handle 22. For example, FIGS. 1, 2, 5 and 8 depict elongated first lever 24 pivotally attached to body 4 at pivot pin 26 and spring biased relative to handle 22 by helical spring 28. Lever 24 includes an end portion 30 and is divided at 32 to extend as an opposite end portion 34 along one side of body 4 and to extend as a corresponding opposite end portion 36 along the opposite side of body 4. At least one elongated second lever is provided, and in the preferred embodiment two elongated second levers are provided. For example, the drawings depict one elongated second lever 38 one end of which is pivotally attached to first lever 24 at pivot pin 40 and another elongated second lever 42 one end of which is pivotally attached to first lever 24 at pivot pin 44. The other end of second levers 38 and 42 include a camming surface 46 which is depicted as a cylindrical roll rotatably mounted between levers 38 and 42 by means of an axle. Second levers 38 and 42 are pivotally attached to body 4 at a position along each second lever between the ends of each lever as at pivot pin 47. First lever 24 includes an elongated aperture 48 into which extends pivot pin 40. First lever 24 includes a similar elongated aperture (not shown) into which the pivot pin 44 extends.

In the preferred embodiment cutting means 10 comprises a cutting element support 50 pivotally attached to body 4 at pivot pin 52. Cutting element support 50 engages camming surface 46 and is spring biased in the general direction of the longitudinal axis 6 towards camming surface 46 and fiber support surface 8. A cutting element 56 is attached to cutting element support 50 such that cutting edge 58 extends towards the fiber support surface 8. It is desirable that a cushioning member 60 be pivotally attached as at pivot pin 64 to the cutting element support 50 such that cushioning member 60 engages, and is spring biased towards, camming surface 46 as by means of spring 66 during the cleaving operation.

Tool 2 further comprises an elongated pivot member 62 which is attached to body 4 and extends along axis 18 which is transverse to longitudinal axis 6. Clamping means 14 comprises a pair of clamps. Each clamp comprises a first jaw member 68 one end of which is pivotally attached to elongated member 62. First jaw members 68 are spring biased away from each other about transverse axis 18 by means of the helical spring 70 shown in FIG. 6. Each clamp also comprises a second jaw member 72 attached to one end 74 of an elongated cam follower 76 which slideably extends through an aperture 78 in first jaw members 68. The second jaw members 72 are spring biased towards an end 80 of first jaw members 68 by means of helical spring 82.

Clamping means 14 further comprises first means generally designated 84 attached to body 4 and moveable in the direction of longitudinal axis 6 towards and away from first jaw members 68 for urging second jaw members 72 away from the first jaw members when such first means is moved towards the first jaw members and allowing the second jaw members to be urged towards the first jaw members when such first means is moved away from the first jaw members. For example, first means 84 is depicted as comprising a first camming member 86 which is slideably attached to body 4 by elongated pivot member 62 which extends through an elongated opening (not shown) in first camming member 86 allowing camming member 86 to be moved along the longitudinal axis 6 towards and away from first jaw members 68. Camming member 86 includes a first surface 88 for engaging an end 90 of the elongated cam followers 76. A second camming member 92 is pivotally attached to body 4 at elongated pivot member 62 for pivoting about the transverse axis 18. First camming member 86 includes a second surface which is depicted as a cylindrical roll 94 attached to first camming member 86 by axle 98 and in engagement with the second camming member 92.

A third lever 96 may be provided, third lever being slidably attached to body 4 by pivot pin 98 which extends from body 4 through an elongated aperture 100 in third lever 96. Third lever 96 is also a pivotally attached to the second camming member 92 at pivot pin 102.

Preferably third lever is spring biased away from the first camming member 86 as, for example, by means of spring 104.

Figure 6:
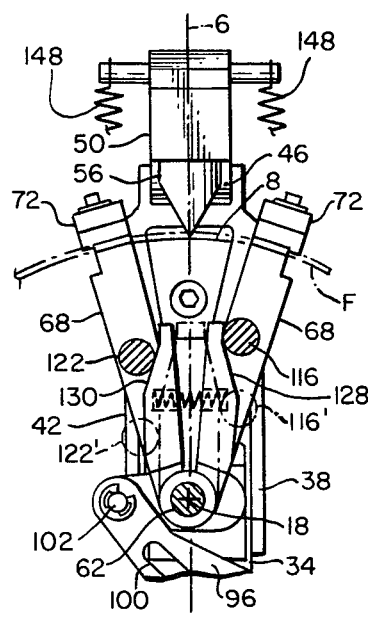
FIG. 6 is a partial sectional view taken along line 6—6 of FIG. 5.

Clamping means 14 further comprises second means generally designated 106 attached to body 4 and moveable in the direction of longitudinal axis 6 towards and away from first jaw members 68 for causing first jaw members 68 to pivot about transverse axis 18 towards each other when second means is moved away from the first jaw members 68 and allowing the first jaw members to be pivoted away from each other when such second means is moved towards the first jaw members 68. For example, second means 106 is depicted as comprising a slide member 108 which is slideably attached to body 4 for movement in the direction of longitudinal axis 6. Such attachment is by means of elongated pivot member 62 and pin 110 which extend through elongated apertures 112 and 114, respectively of slide member 108. Slide member 108 includes a first cam which is depicted as a cylindrical roll 116 attached to a mount 118 by screw 120. Slide member 108 also includes a second cam which is depicted as a cylindrical roll 122 attached to mount 118 by screw 124. Mount 118 is attached to slide member 108 by screw 126. One of the first jaw member 68 includes a first cam surface 128 and the other first jaw member 68 includes a second cam surface 130. As depicted in FIG. 6, the first cam 116 engages the first cam surface 128 and the second cam 122 engages the second cam surface 130. Movement of slide member 108 in the direction of the longitudinal axis 6 causes first and second cams 116, 122 to move into and out of engagement with first and second cam surfaces 128, 130. For example, first and second cams are depicted in FIG. 6 by phantom lines 116' and 122', respectively to depict the position of cams 116 and 122 when slide member 108 is in the position depicted in FIG. 1. By sliding slide member 108 of FIG. 1 towards the cutting element support 50 as far as apertures 112 and 114 will allow, cams 116, 122 will assume the positions depicted in FIG. 6 in solid lines. For purposes of clarity in the drawings only the cams and cam surfaces are depicted in phantom lines, it being understood that movement of the cam surfaces 128, 130 is accompanied by corresponding movement of the arms 68 of which the cam surfaces are associated. Preferably, the first and second cams are positioned relative to the first and second cam surfaces such that the first cam engages the first cam surface before the second cam engages the second cam surface when slide member 108 is caused to be moved towards cutting element support 50. For example, as depicted in FIGS. 1 and 6, first cam 116 is offset relative to second cam 122 such that movement of slide member 108 towards cutting element support 50 will cause cam 116 to engage the first cam surface 128 before cam 122 engages the second cam surface 130.

Actuators 132 are depicted on both sides of body 4. Each actuator includes a first end pivotally attached to body 4 at pivot pin 26. Both sides of body 4 include an elongated linkage 134 one end of each of which is pivotally attached to a second end of actuator 132 at pivot pins 136. The other end of each linkage member 134 is pivotally attached to slide member 108 at screws 138 (only one side shown). In the preferred embodiment means are associated with first lever 24 for engaging actuators 132 and causing actuators 132 to pivot about pivot pin 26 relative to body 4 to slide the slide member 108 in the direction of longitudinal axis 6 and towards the cutting element support 50 when the first lever 24 is pivoted about pivot pin 26 relative to body 4 towards handle 22. For example, first lever 24 may include a stepped or cut out portion on each side having a wall 140 (FIG. 1 shows one side) which abuts actuators 132 such that movement of first lever 24 toward handle 22 urges walls 140 against actuators 132 to cause such pivotal movement of the actuator about pivot pin 26.

Figure 7:
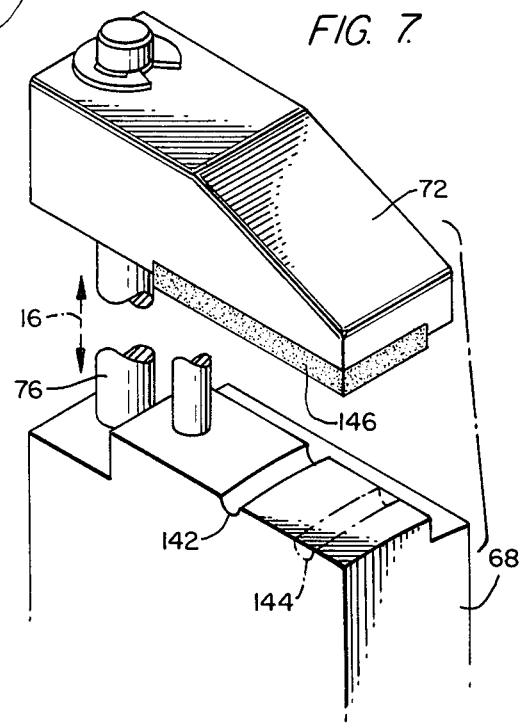
FIG. 7 is a partial perspective exploded view showing a clamping jaw of the present invention; and, FIG. 8 is a partial sectional view taken along line 8—8 of FIG. 5.
Figure 8:
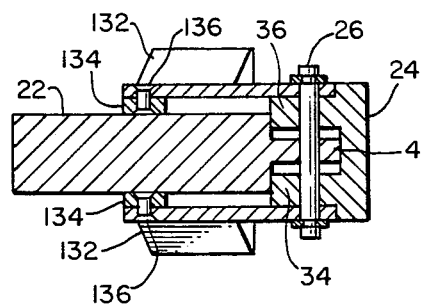

In the preferred embodiment first jaw members 68 include a groove into which optical fiber to be cleaved is inserted as described herein. For example, as depicted in FIG. 7, one of the first jaw members 68 includes a groove 142 generally positioned as shown in solid lines in FIG. 7. The other first jaw member includes a groove 144 generally positioned as shown in phantom lines in FIG. 7. A groove is provided in each first jaw member to assure that optical fiber may be inserted into the pair of clamps from either side of the tool. The grooves are offset relative to each other to assure that any portion of the fiber having a buffer material surrounding the fiber per se may extend into the groove in one of the first jaw members and the portion of the fiber not having any buffer material may extend over the fiber support surface and lie flat upon the portion of the other first jaw member which does not have a groove. Second jaw members 72 are shown as including a pad 146 made of rubber or the like.

In operation, when it is desired to cleave an optical fiber the various parts of hand tool 2 will be in the positions depicted in FIGS. 1, 2 and 3. The end of the fiber is first stripped of any buffer material and the fiber is laid across fiber support surface 8 between first jaw members 68 and second jaw members 72 in such a manner that the buffer material is located in groove 144 and the end of the fiber not covered with buffer material extends across fiber support surface 8 and lies flat upon the portion of the other first jaw member 68 which is not grooved. Such positioning is generally depicted in FIG. 1. Referring to FIGS. 3 and 4, pressure is then applied to the third lever 96 causing it to slide relative to pin 98 until lever 96 becomes locked into place as pin 98 enters cut out portion 100′ of aperture 100. Such movement of lever 96 which is pivotally attached to second camming member 92 at pin 102 causes second camming member 92 to pivot about elongated pivot member 62 from the position of FIG. 3 where the high point of camming member 92 engages roll 94 to the position of FIG. 4 where the low point of camming member 92 engages roll 94. Such pivotal movement of camming member 92 allows compressed springs 82 to expand to cause the ends 90 attached to elongated cam followers 76 to bear against first surfaces 88 of first camming member 86 such that elongated cam followers 76 and first camming member 86 are forced to move in the direction of longitudinal axis 6 away from first jaw members 68; that is, from the position shown in FIG. 3 to the position shown in FIG. 4. Such movement of elongated cam followers 76 causes second jaw members 72 attached thereto to be urged towards first jaw members 68 to clamp the fiber therebetween as shown in FIG. 4.

Figure 5:
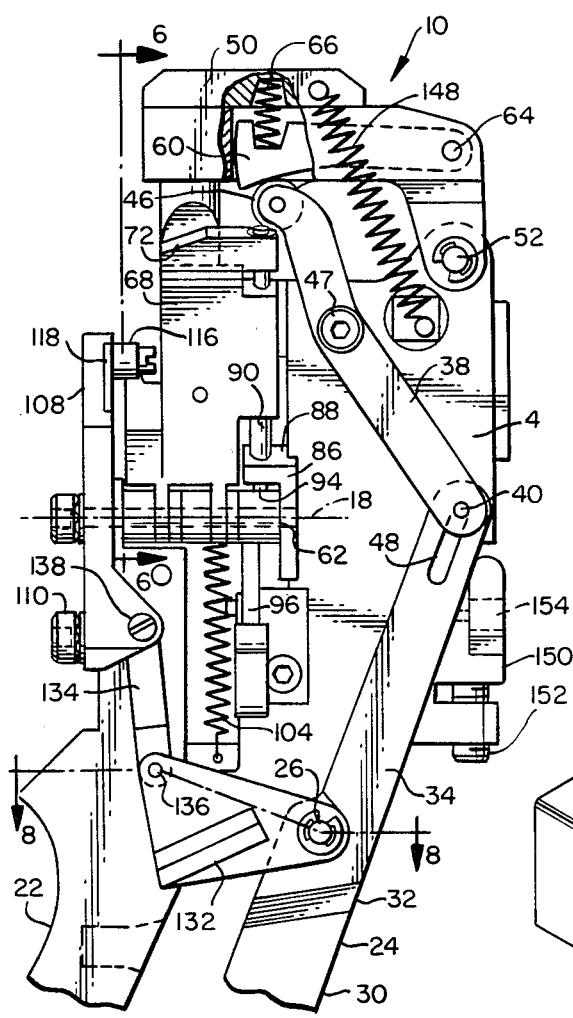
FIG. 5 is a partial side elevational view similar to FIG. 2 showing such cleaving tool in a cleaving position.

After the fiber has been clamped between jaws 68 and 72 lever 24 is urged towards handle 22 as depicted in FIG. 5. Such motion causes walls 140 to bear against actuators 132 causing accuators 132 to rotate about pivot pins 26 and 136 to cause linkage members 134 to urge slide member 108 in longitudinal direction 6 towards cutting element support 50. Such motion of slide member 108 causes first cam 116 to engage first camming surface 128 thereby allowing surface 128 and its associated first and second jaw members 68 and 72, respectively, to be urged away from the first and second jaw members 68 and 72, respectively, associated with second camming surface 130 under the pressure of compressed spring 70. Such motion exerts tension upon the fiber F as one clamp is urged away from the other. By continuing to urge lever 24 towards handle 22 second cam 22 engages second camming surface 130 thereby allowing surface 130 and its associated first and second jaw members 68 and 72, respectively, to be urged away from the first and second jaw members 68 and 72, respectively, associated with first camming surface 128 under the pressure of spring 70. In other words, when cams 116 and 122 are in engagement with surfaces 128 and 130, respectively, spring 70 exerts a force against both of first jaw members 68 to urge the two clamps apart. As fiber F becomes tensed to the extent possible first jaw members 68 cease to pivot apart about elongated pivot member 62 and are held in place by virtue of the tensed fiber F being held between the two clamps. At this point further movement of slide member 108 towards cutting element support 50 causes cams 116 and 122 to be removed from camming surfaces 128 and 130, respectively. While first lever 24 is being urged towards handle 22, first lever 24 is caused to pivot about pin 26 causing pin 40 of second lever 38 to slide along aperture 48 causing second lever 38 to pivot about pin 47. As depicted in FIGS. 1 and 5, such motion causes camming surface 46 to move from right to left towards cutting element 56. As camming surface 46 rolls relative to cutting element support 50, support 50 pivots about pin 52 such that springs 148 urge cutting element support 50, cutting element 56 and cutting edge 58 towards the fiber F and fiber support surface 8. Such movement is cushioned as cushioning member 60 pivots about pin 64 and is urged to compress spring 66 by camming surface 46. Lever 24 is urged towards handle 22 until ends 34 and 36 engage stop member 150 as shown in FIG. 5. The depth with which cutting edge 58 penetrates fiber F may be controlled by limiting the distance which ends 34 and 36 of first lever 24 are pivoted thereby controlling the distance which second lever 38 pivots about pin 47. This may be accomplished by adjusting stop member 150 by means of set screw 152. Stop member 150 is attached to body 4 by screw 154 which extends through an elongated opening (not shown) in stop member 150. In this manner, stop member 150 may be moved in the direction of longitudinal axis 6 by adjusting set screw 152 as desired. In any event, by the time ends 34 and 36 of first lever 24 engage stop member 150, the cutting edge 58 will have impacted against fiber F under the cushioning effect of cushioning member 60 and cleaving of the fiber is effected. When the fiber is severed the first jaw members 68 are urged further apart by spring 70 until once again surface 128 engages cam 116 and surface 130 engages cam 122, as depicted in FIG. 6, to prevent further collision between the fiber F and cutting element 56. To repeat the cleaving operation the tool is returned to the position depicted in FIGS. 1, 2 and 3.

The preferred embodiment may include means to adjust the tension in spring 148 to control the force with which cutting element 56 cleaves fiber F. To this end one end of the spring 148 may be attached to an eccentrically mounted pin 150 the turning of which varies the length of the spring 148 to control tension thereof accordingly.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is:

1. A hand-held tool for cleaving optical fibers, the tool comprising:
    an elongated body having a longitudinal axis extending lengthwise thereof,
    a fiber support surface attached to said body and extending in a plane transverse to said longitudinal axis,
    cutting means attached to said body and moveable in the general direction of said longitudinal axis towards said fiber support surface for severing an optical fiber extending across said fiber support surface,
    clamping means pivotally attached to said body for clamping said optical fiber and for pivotal movement about an axis transverse to said longitudinal axis for holding said optical fiber under tension,
    a handle extending from said body,
    at least one elongated first lever pivotally attached to said body for pivotal movement relative to said body and said handle and spring biased relative to said handle,
    at least one elongated second lever one end of which is pivotally attached to said first lever, the other end of said second lever including a camming surface, said second lever also being pivotally attached to said body at a position along said second lever between said ends
    wherein pivotal movement of said elongated first lever is effective to cause the application of tensile force along an axial direction of an optical fiber and wherein pivotal movement of said elongated first lever beyond movement effective to cause the application of tensile force to an optical fiber is effective to cause movement of the cutting means in the general direction of said longitudinal axis toward said fiber support surface so as to sever an optical fiber extending across said support surface.

2. The tool of claim 1 wherein said cutting means comprises a cutting element support pivotally attached to said body and engaging said camming surface and spring biased generally in the direction of said longitudinal axis towards said camming surface and said fiber support surface, a cutting element attached to said cutting element support, and a cushioning member pivotally attached to said cutting element support and engaging and being spring biased towards said camming surface during a cleaving operation.

3. The tool of claim 2 further comprising an elongated pivot member attached to said body and extending along an axis transverse to said longitudinal axis; and, wherein said clamping means comprises
    a pair of clamps each clamp comprising (a) a first jaw member one end of which is pivotally attached to said elongated member, said first jaw members being spring biased away from each other about said transverse axis, and (b) a second jaw member attached to one end of an elongated cam follower which slideably extends through an aperture in said first jaw member, said second jaw member being spring biased towards the other end of said first jaw member;
    first means attached to said body moveable in the direction of said longitudinal axis towards and away from said first jaw member for urging said second jaw member away from said first jaw member when said first means is moved towards said first jaw member and allowing said second jaw member to be urged towards said first jaw member when said first means is moved away from said first jaw member; and,
    second means attached to said body moveable in the direction of said longitudinal axis towards and away from said first jaw member for causing said first jaw members to pivot about said transverse axis towards each other when said second means is moved away from said first jaw members and allowing said first jaw members to be pivoted away from each other when said second means is moved towards said first jaw members.

4. The tool of claim 3 wherein said first means comprises a first camming member which is slideably attached to said body for said longitudinal movement, said camming member having a first surface engaging the other end of said elongated cam followers.

5. The tool of claim 4 wherein said first means further comprises a second camming member pivotally attached to said body at said elongated member for pivoting about said transverse axis, and wherein said first camming member further includes a second surface engaging said second camming member.

6. The tool of claim 5 wherein said first means further comprises a third lever, said third lever being slideably attached to said body and pivotally attached to said second camming member.

7. The tool of claim 6 wherein said third lever is spring biased away from said first camming member.

8. The tool of either claim 3, 6 or 7 wherein said second means comprises a slide member which is slideably attached to said body for said longitudinal movement, said slide member having a first cam and a second cam attached thereto, and wherein one of said first jaw members includes a first cam surface and the other of said first jaw members includes a second cam surface, said first cam engaging said first cam surface and said second cam engaging said second cam surface during said longitudinal movement.

9. The tool of claim 8 wherein said first and second cams are positioned relative to said first and second cam surfaces such that said first cam engages said first cam surface before said second cam engages said second cam surface.

10. The tool of claim 9 wherein said second means further includes at least one actuator having a first end pivotally attached to said body, and an elongated linkage member, one end of said linkage member being pivotally attached to a second end of said actuator and the other end of said linkage member being pivotally attached to said slide.

11. The tool of claim 10 including means associated with said first lever for engaging said actuator and causing said actuator to pivot relative to said body to slide and slide member in the direction of said longitudinal axis and towards said cutting element support when said first lever is pivoted relative to said body towards said handle.

* * * * *